US012580522B2

(12) United States Patent
Ory et al.

(10) Patent No.: US 12,580,522 B2
(45) Date of Patent: Mar. 17, 2026

(54) METHOD FOR ELECTRICALLY CHARACTERIZING THE CELLS OF A PHOTOVOLTAIC MODULE

(71) Applicant: Electricite de France, Paris (FR)

(72) Inventors: Daniel Ory, Fontenay Aux Roses (FR); Celia Aider, Orsay (FR); Sébastien Jutteau, Igny (FR)

(73) Assignee: Electricite de France (FR)

( * ) Notice: Subject to any disclaimer, the term of this patent is extended or adjusted under 35 U.S.C. 154(b) by 0 days.

(21) Appl. No.: 18/717,819

(22) PCT Filed: Dec. 8, 2022

(86) PCT No.: PCT/FR2022/052284
§ 371 (c)(1),
(2) Date: Jun. 7, 2024

(87) PCT Pub. No.: WO2023/105169
PCT Pub. Date: Jun. 15, 2023

(65) Prior Publication Data
US 2025/0055419 A1    Feb. 13, 2025

(30) Foreign Application Priority Data
Dec. 9, 2021    (FR) ........................................ 2113241

(51) Int. Cl.
*H02S 50/15*        (2014.01)
(52) U.S. Cl.
CPC .................................... *H02S 50/15* (2014.12)
(58) Field of Classification Search
CPC .................................................. H02S 50/15
See application file for complete search history.

(56) References Cited

U.S. PATENT DOCUMENTS

2011/0153228 A1*    6/2011    Ahmad ................ G01R 31/308
356/237.5

FOREIGN PATENT DOCUMENTS

| CN | 108680486 A | 10/2018 |
| EP | 2343534 A1 | 7/2011 |
| EP | 3447908 A1 | 2/2019 |

OTHER PUBLICATIONS

Liu, et al., Solar Energy Materials and Solar Cells, 144, 2016, 523-531 (Year: 2016).*

(Continued)

*Primary Examiner* — Sadie White
(74) *Attorney, Agent, or Firm* — Lerner David LLP

(57)        ABSTRACT

The invention relates to a method for electrically characterising the cells of a photovoltaic module. Said method comprises measuring (MES) the light intensity emitted by electro luminescence by each of the cells according to a voltage applied to the module. Said method further comprises determining (RI), based on the measurements of the light intensity emitted by electroluminescence by each of the cells in a first voltage range applied to the module, hierarchical relationships of analytical relationships between first characteristic electrical parameters of the cells. Said method further comprises determining (R2), based on the measurements of the light intensity emitted by electroluminescence by each of the cells in a second voltage range applied to the module, hierarchical relationships of analytical relationships between second characteristic electrical parameters of the cells.

8 Claims, 7 Drawing Sheets

(56) References Cited

OTHER PUBLICATIONS

Hinken (Year: 2007).*
Ory (Year: 2021).*
Potthoff (Year: 2010).*
International Search Report for Application No. PCT/FR2022/052284 mailed Feb. 15, 2023. 3 pgs.
Daniel Ory, et al., Extended quantitative characterization of solar cell from calibrated voltage-dependent electroluminescence imaging. J. Appl. Phys. Jan. 28, 2021; 129 (4): 043106. <https://doi.org/10.1063/5.0021095> . 12 pgs.
French Preliminary Report for Application No. FR 2113241 completed Jun. 27, 2022. 2 pgs. (see pp. 1-2, categorizing the cited references).

* cited by examiner

METHOD FOR ELECTRICALLY CHARACTERIZING THE CELLS OF A PHOTOVOLTAIC MODULE

CROSS-REFERENCE TO RELATED APPLICATIONS

The present application is a national phase entry under 35 U.S.C. § 371 of International Application No. PCT/FR2022/052284, filed Dec. 8, 2022, published in French, which claims priority from French Patent Application No. 2113241 filed Dec. 9, 2021, all of which are incorporated herein by reference.

TECHNICAL FIELD

The field of the invention is that of the characterization of photovoltaic modules, for example in order to optimize their manufacturing processes or study their ageing.

The invention more specifically relates to the electrical characterizing of cells forming a photovoltaic module by means of the observation of a light emitted by an electroluminescence phenomenon.

PRIOR ART

A photovoltaic module is composed of individual cells connected in series or in series-parallel in order to obtain the desired power by increasing the voltage rather than by increasing the current that is a source of Joule effect losses. This disposition is common to all technologies of photovoltaic module, whether the module is composed of silicon cells or cells of thin films made of CIGS, CdTe or Perovskite.

The characterizing of a photovoltaic module can be done by taking electrical measurements of current-voltage I-V type which are used to quantify the power of the module along with its essential electrical characteristics which are the serial resistance, the parallel resistance, the recombination current, or else the ideality factor.

These characteristics are obtained for the module as a whole. Once the module has been manufactured, the individual characterization of the cells is impossible by this method. Note that while the individual characterizing of the cells is possible before assembly for silicon cell modules, it remains impossible for thin film cell modules.

However, it is desirable to know the electrical characteristics mentioned above cell-by-cell in order to be able to study the module, not only just after manufacturing, but also after accelerated ageing or in production.

Electroluminescence imagery is another method of characterization which makes it possible to identify areas of weak/strong electronic recombinations and/or mechanical failure (cracks) and thus make a qualitative cell-by-cell judgement, with no quantification.

However, the identification of the causes for the inferior performance of a photovoltaic module formed of the series connection of individual cells (or of arrays of modules connected in series) is not easy based on the production of a single electroluminescence or photoluminescence image.

In particular, the distinction of the effect of the parallel resistance (also known as shunt resistance) or of the dark recombination current (characteristic of electronic defects) is then not feasible. It is known that a low-voltage electroluminescence image highlights the shunt (current leak) areas of a photovoltaic device (cell or module). On the other hand, in the case of a module combining cells in series, measurement at a single low voltage does not make it possible to decide with certainty between a lower parallel resistance in the case where the dark recombination current would also be lower for the same cell. Similarly, a high-voltage image does not make it possible to discern a loss of electroluminescence intensity due to a higher series resistance or a higher dark recombination current and still less a combination of the two loss sources.

SUMMARY OF THE INVENTION

The invention has the aim of supplying a solution which makes it possible to obtain a quantitative assessment of the individual electrical features of the different cells forming a photovoltaic module.

For this purpose, the invention makes provision for a method for electrically characterizing cells forming a photovoltaic module comprising a step of receiving measurements of the luminous intensity emitted by electroluminescence by each of the cells as a function of a voltage applied to the module. This method moreover comprises a step of determining, based on the measurements of the luminous intensity emitted by electroluminescence by each of the cells in a first voltage range applied to the module, of hierarchical relationships or analytical relationships between first characteristic electrical parameters of the cells. This method further comprises a step of determining, based on measurements of the luminous intensity emitted by electroluminescence by each of the cells in a second voltage range applied to the module, of hierarchical relationships or analytical relationships between second characteristic electrical parameters of the cells.

The term "determining of hierarchical relationships between parameters" should be understood to mean the establishment of a hierarchy between these parameters. The term "determining of analytical relationships between parameters" should be understood to mean the fact of linking these parameters by analytical equations and computing these parameters.

Certain preferred but non-limiting aspects of this method are as follows:

the cells being connected in series to form a single branch of cells, the determining steps comprise the determining of analytical relationships between the first and the second characteristic electrical parameters of the cells;

the cells being distributed over several parallel branches and being connected in series on each branch, the determining steps comprise, for each of the branches, the determining of analytical relationships between the first and the second characteristic electrical parameters of the cells of the branch;

the determining steps comprise the determining of hierarchical relationships between the first and the second characteristic electrical parameters of the cells;

the determining steps each comprise a hierarchical ordering of the measurements of the luminous intensity emitted by electroluminescence by each of the cells respectively in the first voltage range applied to the module and in the second voltage range applied to the module;

it further comprises a step of estimating, using the hierarchical relationships or analytical relationships, parameters of an electrical model of the module including the first and the second characteristic electrical parameters of the cells;

the estimating of the parameters of the electrical model of the module comprises the solving of an optimization problem using, as constraints, said hierarchical relationships or said analytical relationships, the parameters thus estimated making it possible to match, for each of the cells, the luminous intensity measurements taken for the cell with a luminous intensity computed for the cell based on the electrical model of the module;

the parameters of the electrical model include one or more characteristic electrical parameters of the module;

the first characteristic electrical parameter of a cell is a leakage resistance of the cell, the second electrical parameter is a dark current of the cell and the first voltage range covers weaker voltages than the voltages covered by the second voltage range;

it further comprises the determining of a series resistance of each of the cells;

the measurements of the luminous intensity emitted by electroluminescence by each of the cells are average intensity measurements.

BRIEF DESCRIPTION OF THE DRAWINGS

Other features aspects, aims, advantages and features of the invention will become more apparent on reading the following detailed description of preferred forms of embodiment thereof, given by way of non-limiting example, and given with reference to the appended drawings wherein.

DETAILED SUMMARY OF PARTICULAR EMBODIMENTS

The subject of the invention is a method for electrically characterizing cells forming a photovoltaic module, this method comprising the determining of characteristic electrical parameters of each of the cells (for example parallel resistance, serial resistance, ideality factor(s), or dark recombination current).

Figure 1:
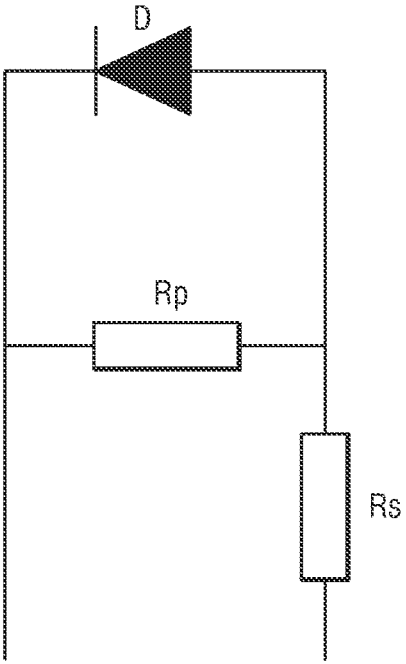
FIG. 1 is a diagram of an electrical model of a cell of a photovoltaic module.
Figure 2:
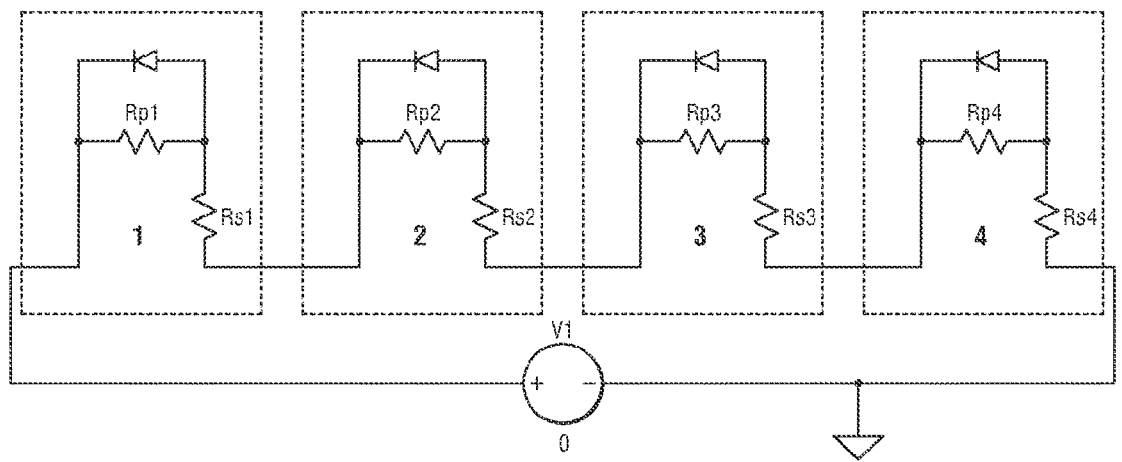
FIG. 2 is a diagram of an electrical model of a photovoltaic module composed of four cells connected in series.

With regard to this, FIG. 1 shows an example of an electrical model (i.e. an equivalent circuit) of a cell of a photovoltaic module which here includes a diode D as well as the serial resistance Rs and the parallel resistance Rp characteristic of the cell. A model with two diodes is possible. FIG. 2 meanwhile illustrates an electrical model of a module composed of four series cells each having as equivalent circuit the model of FIG. 1.

The invention is based on the observation made by the inventors that certain electrical parameters of the component cells of the module have effects on the electroluminescence intensity, and do so for different voltage ranges. With several electroluminescence images obtained by varying the voltage applied to the module, it is thus possible to obtain an assessment of a module which covers all its electrical parameters on the scale of the cells, and in particular to determine hierarchical or analytical relationships between the characteristic electrical parameters of the cells.

A model made by the inventors was used to establish the comparative variation in the electroluminescence intensity of one (so-called defective) cell affected by a lower parallel resistance compared with the others, all other things being equal. This model is based on a module with four cells connected in series, one of which is defective and the other three of which have a parallel reference resistance taken as equal to 1000Ω.

Figure 3:
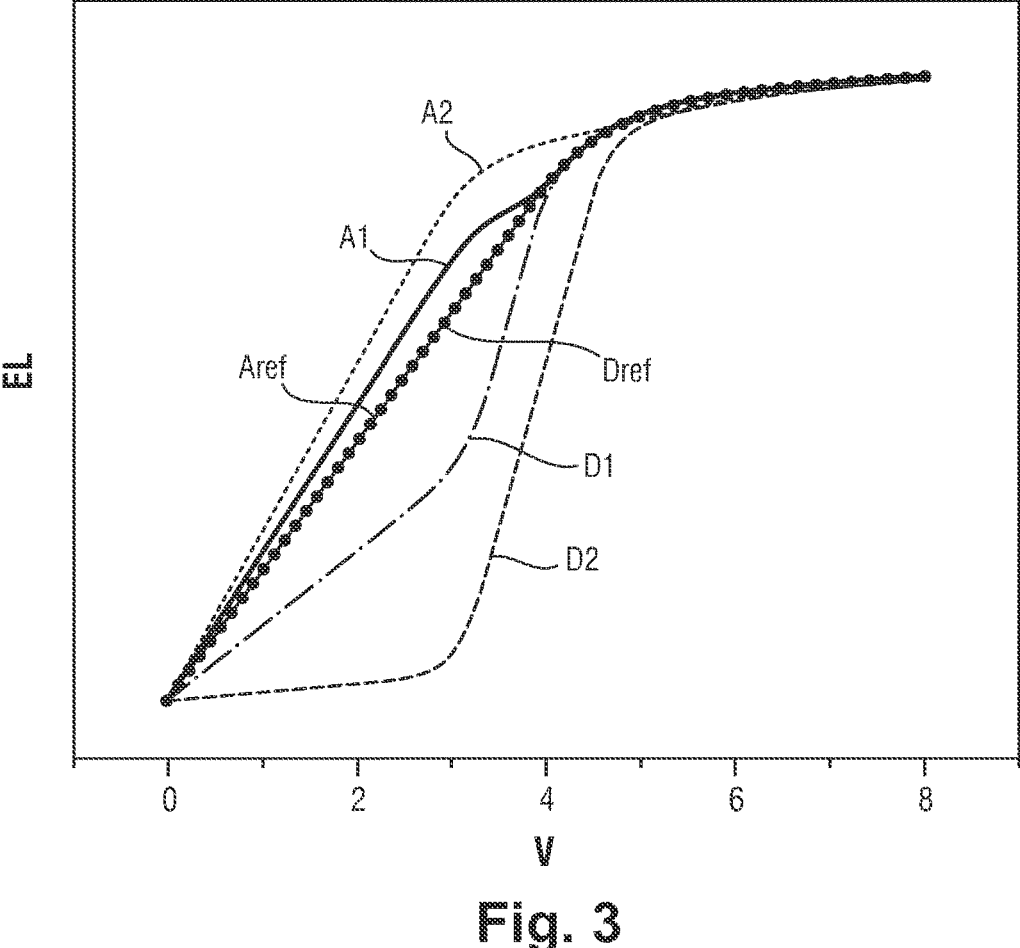
FIG. 3 shows the electroluminescence intensity of the cells of a module, in which one of the cells is affected by a lower parallel resistance than that of the other cells of the module, as a function of the voltage applied to the module.

FIG. 3 thus represents the average electroluminescence intensity EL of the defective cell (in arbitrary units) as a function of the voltage V applied to the module (in Volts), and for different values of parallel resistance of the defective cell. Thus, the parallel resistance of the defective cell is of 1000Ω for the curve Dref, of 500Ω for the curve D1 and of 50Ω for the curve D3.

FIG. 3 also represents the average electroluminescence intensity EL of each of the other three cells as a function of the voltage V applied to the module, and for different values of parallel resistance of the defective cell. Thus, the parallel resistance of the defective cell is of 1000Ω for the curve Aref, of 500Ω for the curve A1 and of 50Ω for the curve A2.

It can be seen from FIG. 3 that at low voltages (0 to 4V approximately), the cell with a low parallel resistance sees its electroluminescence intensity decrease, but also that the electroluminescence intensity of the other cells increases correspondingly, which is not intuitive.

Figure 4:
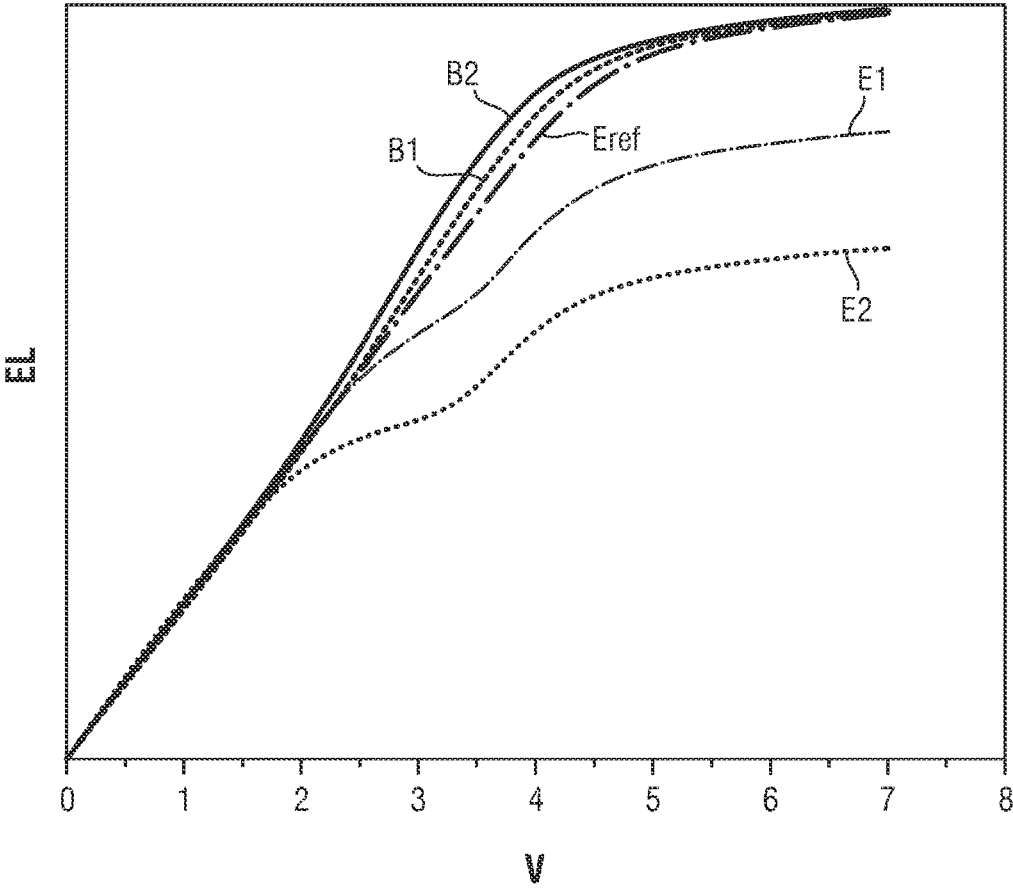
FIG. 4 shows the intensity of electroluminescence of the cells of a module, in which one of the cells is affected by a higher recombination current than that of the other cells of the module, as a function of the voltage applied to the module.
Figure 5:
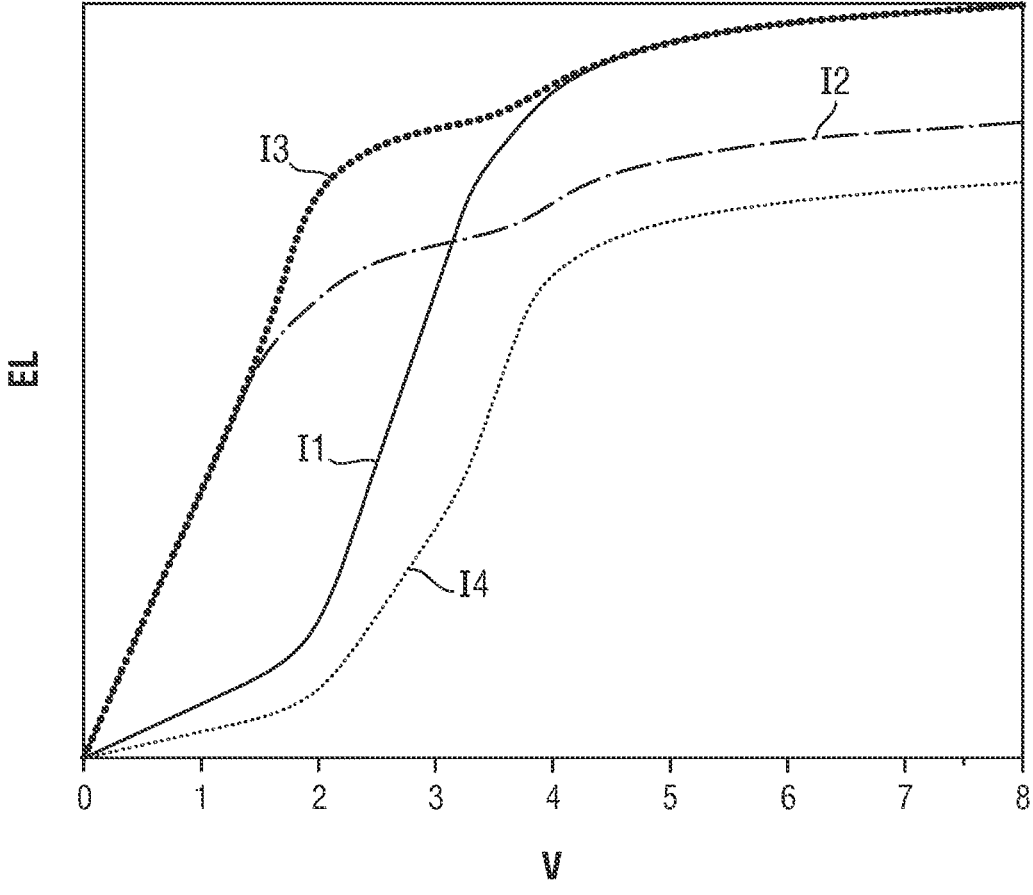
FIG. 5 shows measurements of the electroluminescence intensity for different cells of a module, based on which hierarchical or analytical relationships between electrical parameters of the cells can be determined.

A similar model was used to compare the effect of a recombination current which is higher in one (so-called defective) cell than in the others (for which the recombination current is of 6.10-14 A). FIG. 5 thus represents the average electroluminescence intensity EL of the defective cell as a function of the voltage applied to the module, and for different values of recombination current of the defective cell. Thus, the recombination current of the defective cell is of 10-14 A for the curve Eref, of 6.10-12 A for the curve E1 and of 10-10 A for the curve E2. FIG. 4 also represents the average electroluminescence intensity EL of each of the other cells as a function of the voltage applied to the module, and for different recombination values of the defective cell. Thus, the recombination current of the defective cell is of 10-12 A for the curve B1 and of 10-10 A for the curve B2.

It can be seen from FIG. 4 that over a voltage range between 2V and 5V, the defective cell with a high recombination current has a less intense electroluminescence intensity than that of the other cells but also that the electroluminescence intensity of the cells with lower recombination current is further increased thereby.

Making use of these findings, and with reference to FIG. 1, the method according to the invention comprises:

a step MES of receiving measurements of the light intensity emitted by electroluminescence by each of the cells (for example an average electroluminescence intensity per cell) as a function of a voltage applied to the module;

a step R1 of determining, based on the measurements of the luminous intensity emitted by electroluminescence by each of the cells in a first voltage range applied to the module, of hierarchical relationships or analytical relationships between first characteristic electrical parameters of the cells (i.e. establishing a hierarchy between the first characteristic electrical parameters of the cells or computing said first parameters);

a step (R2) of determining, based on the measurements of the luminous intensity emitted by electroluminescence by each of the cells in a second voltage range applied to the module, of hierarchical relationships or analytical relationships between second characteristic electrical parameters of the cells (i.e. establishing a hierarchy between the second characteristic electrical parameters of the cells or computing said second parameters).

The taking of the measurements thus comprises the ordered recording of a set of electroluminescence images over an extended voltage range, for example of 0V to Voc+20% where Voc denotes the open circuit voltage. These images are then made use of to determine an electroluminescence intensity per cell as a function of the voltage applied to the module, for example an average intensity per cell.

Moreover, the first electrical parameter characteristic of a cell can be a leakage resistance of the cell, the second electrical parameter can be a dark current of the cell and the first range of voltages may cover lower voltages than the voltages covered by the second range of voltage.

It is known that the luminescence EL emitted by a module/a cell can be modelled in the following form as a function of the energy E of the photons and of the location r on the module/cell and as a function of the voltage V across the terminals of the module/cell, EQE(E,r) being the external quantum efficiency, $\phi_{bb}$ the black body emission (Planck's law), $QE_{cam}$ the quantum efficiency of the camera used, q the elementary charge, k Boltzmann's constant and T the temperature in Kelvins.

$EL(V) =$ $$\int\int \phi_{el}(E,r)drdE = \int\int \left(e^{\frac{qV(r)}{kT}} - 1\right) * EQE(E,r) * \phi_{bb} * QE_{cam} * drdE$$

Several assumptions can be made to simplify this expression.

Assuming EQE(E,r) constant. This then gives for each cell $$EL_{cell\_i}(V_{cell\_i}) = \text{constant} * \left(e^{\frac{qV_{cell\_i}}{kT}} - 1\right)$$

as a function of the voltage $V_{cell\_i}$ across the terminals of the diode of the cell i of the module;

Assuming that the EQE(E,r) of the cells of the model are proportional to one another, for example in the form $EQE(E,r)=K_{cell}*EQE_{ref}$. This then gives for each cell $$EL_{cell\_i}(V_{cell\_i}) = K_{cell\_i} * \text{constant} * \left(e^{\frac{qEL_{cell\_i}(V_{cell\_i})}{kT}} - 1\right)$$

as a function of the voltage across the terminals of the diode of the cell i of the module. This method allows for a more realistic model, but requires measuring or evaluating of the coefficient $K_{cell\_i}$.

Determining Analytical Relationships and Computing the Electrical Parameters

From the relationship $$EL_{cell\_i}(V_{cell\_i}) = \text{constant} * \left(e^{\frac{qV_{cell\_i}}{kT}} - 1\right)$$

set out previously, it appears that the voltage $V_{cell\_i}$ across the terminals of each diode "i" of each cell "i" (source of the luminescence $EL_{cell\_i}$) is written $$V_{cell\_i} = \frac{kT}{q} * \ln\left(1 + \frac{EL_{cell\_i}}{A}\right), \tag{1}$$

A representing the constant.

Considering a module composed of m cells connected in series to form a single branch of cells, assuming that the constant A is common to all the cells and knowing that the voltage across the terminals of the module $V_{mod}$ is equal to the sum of the voltages across the terminals of the "m" diodes, the constant A is then computed as $$A = e^{-q*\frac{V_{mod}}{mKT}} * \prod_i EL_{cell\_i}^{1/m},$$

for a voltage $V_{mod}$ such as $$e^{\frac{qV_{cell\_i}}{kT}} \gg 1.$$

A similar computation can be used to determine A in the case of a module composed of series-parallel cells.

During step R1, it is possible, in a first voltage range applied to the module covering lower voltages than the voltage of the open circuit Voc, to determine analytical relationships between the parallel resistances of the cells.

At low voltage, the electrical model of the diode is simplified as follows $$I_i = I_{module} = \frac{V_{cell\_i}}{Rp_i}$$

the current passing through the cell i, $I_{module}$ the current passing through the module and $Rp_i$ the parallel resistance of the cell i. One can then demonstrate the following analytical relationship for any pair of cells $$(i, j): \frac{Rp_i}{Rp_j} = \frac{V_{cell\_i}}{V_{cell\_j}}. \tag{2}$$

Moreover, the total parallel resistance of the module $Rp_{module}$ is equal to the sum of the parallel resistances of the series cells: $Rp_{mod}=\Sigma_i Rp_i$.

This gives $$V_{cell\_i} = V_{mod} * \frac{Rp_i}{Rp_{mod}},$$

which leads to $$Rp_i = \frac{kT}{q} * \ln\left(1 + \frac{EL_{cell\_i}}{A}\right) * \frac{Rp_{mod}}{V_{mod}}. \quad (3)$$

The value $Rp_{mod}$ can be determined by means of a measurement and a current-voltage analysis of the module.

In the case of a module composed of a single branch of series cells, the analytical relationship is completely explicit. It can be computed for several voltage values in order to improve its accuracy.

In the case of a module with two branches in parallel with series cells, the total parallel resistance $Rp_{mod}$ in the equation (3) must be replaced by the total resistance of the branch in which the concerned cell is located $Rp_{branche}$ with $$\frac{1}{Rp_{branche}} = \frac{1}{Rp_{branche\_1}} + \frac{1}{Rp_{branche\_2}}$$

and $Rp_{branche\_i} = \Sigma_i Rp_i$ and $Rp_{branche\_j} = \Sigma_j Rp_j$

Thus, in the scenario of a series-parallel module in which the cells are distributed over several parallel branches and are connected in series on each branch, the explicit computation cannot be performed all the way to its end, and a numerical solving as described hereinafter can then be carried out. In particular, the analytical relationships (2) (which are then valid only for the cells within one and the same branch) as well as the equality of the voltages between the branches can be made use of as constraints on the solving of an optimization problem.

During step R2, it is possible, in a second voltage range applied to the module covering higher voltages than the open circuit voltage Voc, to determine analytical relationships between the dark currents of the cells.

To do so, it is first assumed that the series resistance of each cell, and therefore of the module, is negligible. At high voltages, the electrical model of each diode can be simplified in the form $$I = I_{0i} * e^{q \frac{V_{cell\_i}}{kT}}$$

and the analytical relationship between the dark currents of two series cells (i,j) within one module is given by $$\frac{V_{cell\_i}}{n_i} - \frac{V_{cell\_j}}{n_j} = \frac{kT}{q} * \ln\left(\frac{I_{0j}}{I_{0i}}\right), \quad (4)$$

with $n_i$ the ideality factor of the diode i and $I_{0i}$ its dark current.

Usually, at high voltages, $n_i = n = \text{constant}$ and the relationship (4) becomes $$V_{cell\_i} - V_{cell\_j} = n \frac{kT}{q} * \ln\left(\frac{I_{0j}}{I_{0i}}\right) \quad (5)$$

The analytical relationship is then expressed by means of electroluminescence measurements as per $$\frac{I_{0j}}{I_{0i}} = \left(\frac{EL_{cell\_i}}{EL_{cell\_i}}\right)^{\frac{1}{n}} \quad (6)$$

The equality of the currents makes it possible to obtain $$I_{0i} = I_{0\_module} * e^{\frac{q}{nKT} * (V_{mod} - V_{cell\_i})} \quad (7)$$

In this high voltage range, the effect of the series resistance can be significant. In this case, the equation (7) becomes $$I_{0i} = I_{0\_module} * e^{\frac{q}{nKT} * \left(\left(V_{mod} - Rs_{module} * I_{module}\right) - V_{cell\_i}\right)} \quad (8)$$

The dark current of the module $I_{0\_module}$ and its series resistance $Rs_{module}$ can be determined by means of a measurement and a current-voltage analysis of the module.

Here again, the analytical relationship between the dark recombination currents of the different cells is completely explicit. In certain more complex cases (different ideality factor from one cell to the next, mixed parallel/series module), the method remains similar.

Determining Hierarchical Relationships

The hierarchical ordering of the electroluminescence intensities per cell allows a relative qualification and a hierarchical ordering of each of the cells forming the module and of one or more of their electrical parameters. This hierarchical ordering is in particular done in several ranges of voltage applied to the module.

In particular, this hierarchical ordering is done, in step R1, in the first voltage range to determine hierarchical relationships between the first characteristic electrical parameters of each of the cells and, in step R2, in the second voltage range to determine hierarchical relationships between the second characteristic electrical parameters of each of the cells.

In this regard, FIG. 5 illustrates the average electroluminescence intensity I1, I2, I3, I4 of each of four cells forming a module as a function of the voltage V applied to the module. These cells have the following features:

| | Series resistance (Ohm) | Parallel resistance (Ohm) | Dark current (A) | Ideality factor |
|---|---|---|---|---|
| Cell 1 (curve I1) | 2.6 | 200 | 6e−14 | 1.6 |
| Cell 2 (curve I2) | 2.6 | 1000 | 6e−12 | 1.6 |
| Cell 3 (curve I3) | 2.6 | 1000 | 6e−14 | 1.6 |
| Cell 4 (curve I4) | 2.6 | 100 | 6e−11 | 1.6 |

By comparing these intensities in a range of low voltages (from 0 to 2V), it was found that the electroluminescence intensity I2 and I3 of the cells 2 and 3 is similar, whereas that I1 of the cell 1 is less than that I2, I3 of the cells 2 and 3 and that that I4 of the cell 4 is less than that of the cell 1. It can be deduced therefrom that leakage resistances Rp1 and Rp3 of the cells 1 and 3 are similar whereas the leakage resistance Rp1 of the cell 1 is less than them and that the leakage resistance Rp4 of the cell 4 is itself less than that of the cell 1, i.e.: Rp4<Rp1<Rp2=Rp3.

By also comparing the intensities in a range of higher voltages (from 4 to 6V), it was found that the electroluminescence intensity I1 and I3 of the cells 1 and 3 is similar whereas that I2 of the cell 2 is less than that of the cells 1 and 3 and that that I4 of the cell 4 is less than that I2 of the cell 2. It can be deduced therefrom that the dark currents Io1 and Io3 of the cells 1 and 3 are similar, whereas the dark current of the cell 2 is greater than them and that the dark current Io4 of the cell 4 is itself greater than that of the cell 2, i.e.: Io1=Io3<Io2<Io4.

Making Use of the Hierarchical or Analytical Relationships in the Context of Numerical Solving In a possible embodiment, the method according to the invention makes use of the hierarchical relationships (any type of module) or analytical relationships (typically those determined for a series-parallel module) to estimate the values of the characteristic electrical parameter or parameters of the cells forming the module.

This estimate can in particular be done by making use of electrical parameters as hierarchically ordered or computed in the steps R1 and R2 as constraints on the value of the characteristic electrical parameter or parameters of the cells that one wishes to determine.

More precisely, the method according to this embodiment comprises a step FIT during which these values are determined by solving an optimization problem using as constraints the electrical parameters as hierarchically ordered or computed in steps R1 and R2, this solving aiming to determine parameters of an electrical model of the module (for example a model of series diodes in accordance with FIG. 2) which make it possible to match measurements of the luminous intensity (resulting from the step MES) with a luminous intensity computed based on the electrical model of the module, said parameters of the electrical model including the characteristic electrical parameters of the cells.

The computed intensity based on the electrical model here forms a theoretical intensity that one seeks to align, via the optimization of the parameters of the electrical model, with the actual intensity resulting from the measurements.

In other words, the solving of the constrained optimization problem makes it possible to determine the values of the different electrical parameters of each cell (for example parallel resistance, series resistance and dark recombination current) such that the electroluminescence intensity theoretically generated by the electrical model making use of these values is near enough (for example as evaluated by a quadratic error) to the measurements.

In this context, the simplified expressions set out previously (such as for example the relationship $$EL_{cell\_i}(V_{cell\_i}) = \text{constant} * \left( e^{\left( \frac{qV_{cell\_i}}{kT} \right)} - 1 \right)$$

make it possible to determine the electroluminescence intensity generated by the electrical model for given values of the characteristic electrical parameters of the different cells. More specifically, the electroluminescence intensity of a cell is a function of the voltage across the terminals of the diode of the cell, a voltage which results from the model and values of the characteristic electrical parameters of the cells and which can for example be determined by means of an electrical circuit simulation software such as LTSpice®.

Figures 6, 7:
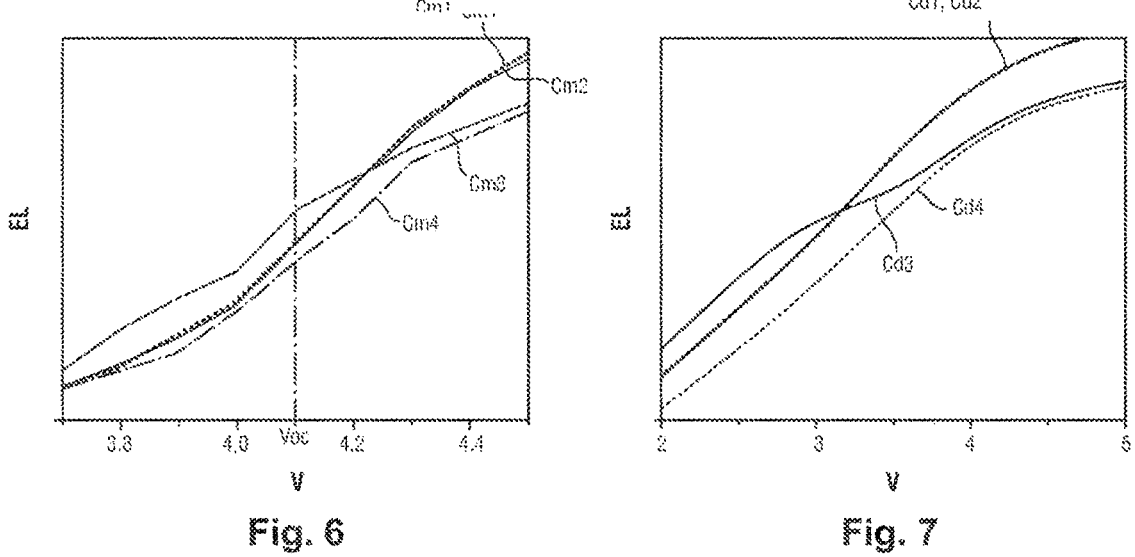
FIG. 6 shows measurements of electroluminescence intensity for different cells of a module.
FIG. 7, given by way of comparison with FIG. 6, shows the electroluminescence intensity of the cells as resulting from an electrical model, the electrical parameters of which come from an example of a solving of an optimization problem.
Figure 8:
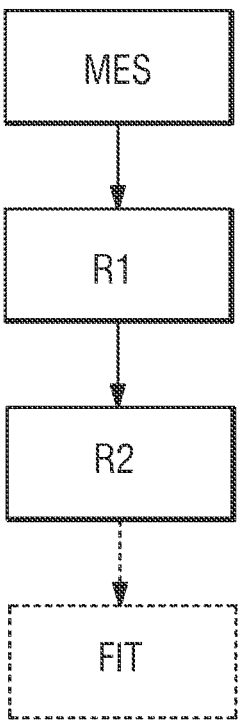
FIG. 8 is a diagram showing the sequence of the main steps of a possible embodiment of the method according to the invention.

FIG. 6 shows measurements of electroluminescence intensity Cm1, Cm2, Cm3, Cm4 for different cells of a module whereas FIG. 7 shows the electroluminescence intensity of the cells Cd1, Cd2, Cd3, Cd4 as resulting from the electrical model, the electrical parameters of which come from the solving of the optimization problem. For each of the cells a good match is observed between the measurements and the intensity resulting from the electrical model of the module.

In a possible embodiment, the electrical model also has for parameters one or more characteristic electrical parameters of the module. In this embodiment, the constraints on the solving of the optimization problem may also comprise the characteristic electrical parameter or parameters of the module. This parameter or parameters may for example be determined by means of a measurement and a current-voltage analysis of the module or else be solved analytically by choosing the following expressions: $Rs_{module}=\Sigma_i R_{si}$, $I_{0_{module}}=\Pi_i I_{0i}$ and $Rp_{module}=\Sigma_i R_{pi}$.

Quantifying the Series Resistance

The series resistance Rsi of a cell i can meanwhile be quantified as follows, using relationships highlighted in the publication by Ory et al., "Extended quantitative characterization of solar cell from calibrated voltage-dependent electroluminescence imaging" (J. Appl. Phys. 129, 043106 (2021)). The electroluminescence curves are adjusted according to the following model, which makes it possible to obtain intermediate parameters $R_{si}^*$ and $I_{0i}^*$.

$$EL_{cell\_i} = I_{0i}^* e^{\left( \frac{V_{cell_i} - R_{si}^* EL_{cell\_i}}{\frac{kT}{q}} \right)}$$

The following relationship is applicable according to the cited publication:

$$Rsi = R_{si}^* * \frac{I_{0i}^*}{I_{0i}}.$$

The invention is not limited to the method previously described but can also be extended to a system for electrically characterizing cells forming a photovoltaic module, which can comprise an electroluminescence image capturing system, and comprising a processor configured to implement the method previously described as well as a computer program product comprising instructions which, when the program is executed by a computer, cause that computer to implement the method previously described.

The invention claimed is:

1. A method for electrically characterizing cells forming a photovoltaic module comprising the steps of:
collecting a set of electroluminescence images for the cells forming a photovoltaic module over a first voltage applied to the module and over a second voltage applied to the module, wherein each electroluminescence image of the set of electroluminescence images captures a luminous intensity emitted by a cell of the cells forming the photovoltaic module;
determining a leakage resistance for each cell using the luminous intensity captured by the electroluminescence images when the first voltage is applied to the module;
determining a dark current for each cell using the luminous intensity captured by the electroluminescence images when the second voltage is applied to the module.

2. The method as claimed in claim 1, wherein the cells are distributed over several parallel branches and are connected in series on each branch, wherein determining leakage resistance for each cell comprises, for each of the branches, computing the leakage resistances of the cells of the branch and wherein determining the dark current for each cell comprises, for each of the branches, computing the dark currents of the cells of the branch.

3. The method as claimed in claim 1, wherein determining leakage resistances for each cell comprises hierarchically ordering the leakage resistances of the cells and wherein determining the dark current for each cell comprises hierarchically ordering the dark currents of the cells.

4. The method as claimed in claim 2, further comprising a step of estimating, using the leakage resistances and dark currents of the cells, parameters of an electrical model of the module.

5. The method as claimed in claim 4, wherein estimating the parameters of the electrical model of the module comprises solving an optimization problem using, as constraints, the leakage resistance and dark currents of the cells, the parameters thus estimated making it possible to match, for each of the cells, the luminous intensity emitted by the cell with a luminous intensity computed for the cell based on the electrical model of the module.

6. The method as claimed in claim 4, wherein the parameters of the electrical model of the module include one or more characteristic electrical parameters of the module.

7. The method as claimed in claim 1, wherein the first voltage is lower than the second voltage.

8. The method as claimed in claim 1, further comprising determining a series resistance of each of the cells.

* * * * *